Oct. 27, 1942.　　F. W. SLACK ET AL　　2,299,935
CONTROL ARM
Filed Feb. 24, 1941
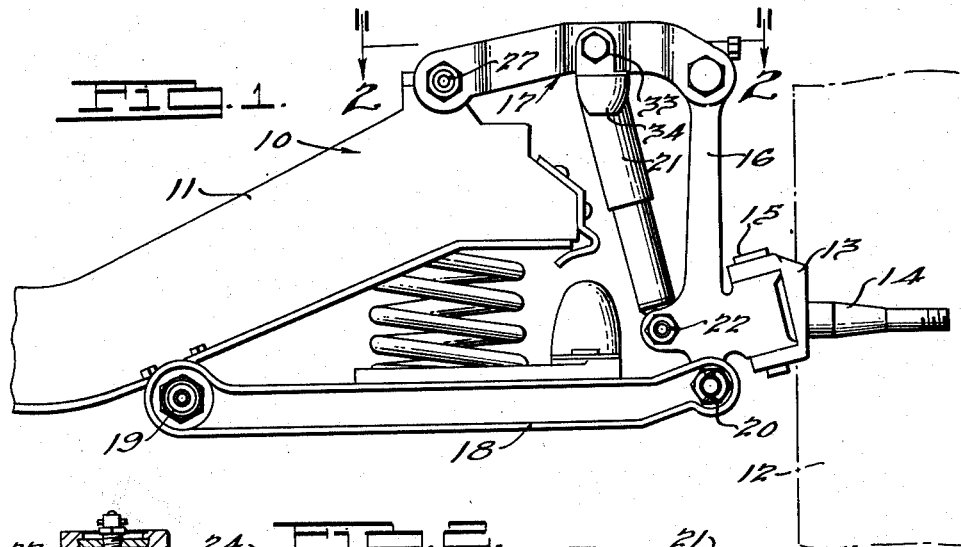
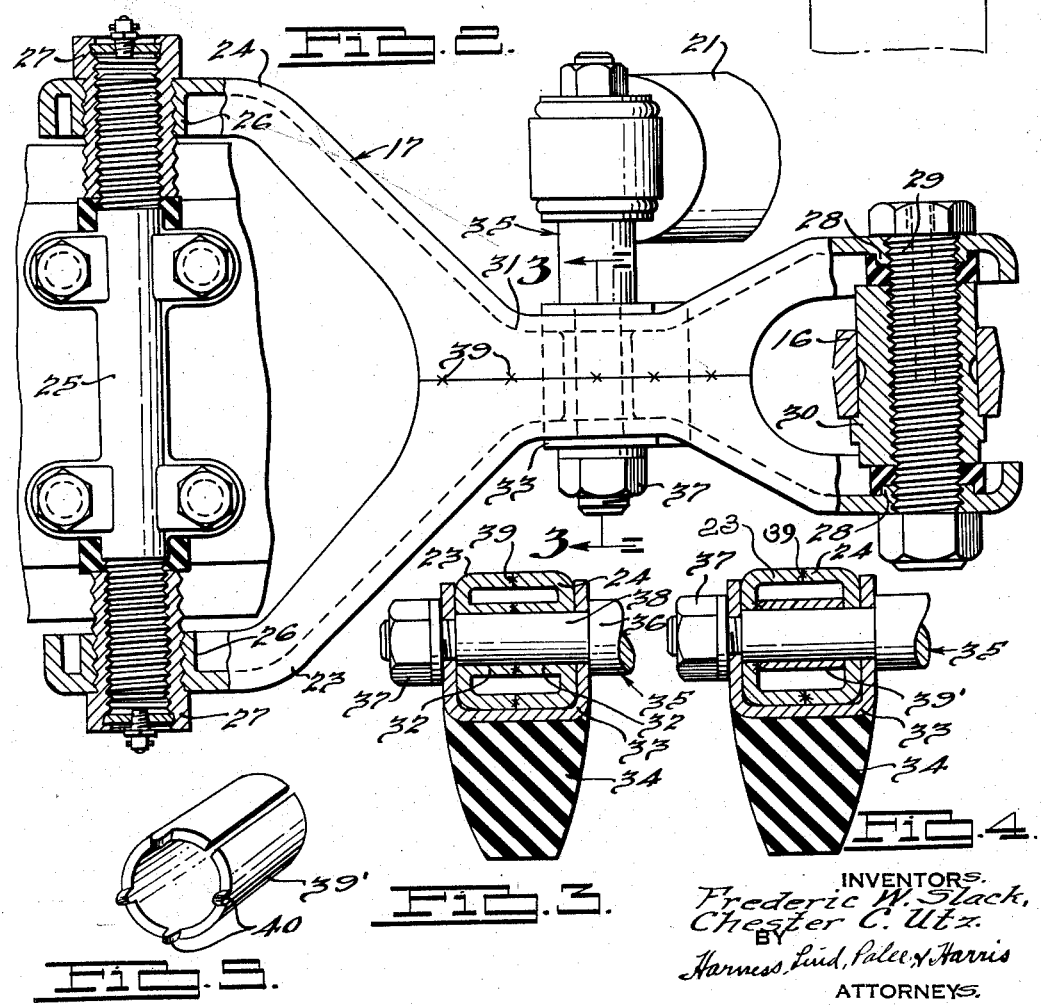
INVENTORS.
Frederic W. Slack,
Chester C. Utz.
BY
Harness, Dick, Pales & Harris
ATTORNEYS.

Patented Oct. 27, 1942

2,299,935

UNITED STATES PATENT OFFICE 2,299,935

CONTROL ARM

Frederic W. Slack and Chester C. Utz, Detroit, Mich., assignors to Chrysler Corporation, Highland Park, Mich., a corporation of Delaware Application February 24, 1941, Serial No. 380,288

11 Claims. (Cl. 267—20)

This invention relates to a control arm and is a continuation in part of our copending application, Serial No. 297,788.

More particularly, the invention relates to a control arm or linkage especially adapted for use in independent wheel suspension systems for motor vehicles although the invention in its broader aspects is not to be so limited.

An object of the invention is the provision of a control arm representing a simplified design, which possesses the maximum strength and rigidity for a minimum of weight, and which can be economically manufactured and assembled.

More particularly, an object of the invention is the provision of a control arm or linkage comprising sheet metal members, preferably channel-shaped in cross section and which are so constructed and arranged as to rigidify and strengthen the arm. In carrying out the objects of the invention there are preferably provided a pair of channel arms so constructed and arranged as to provide a box in cross section.

A still further object of the invention is the provision of an improved construction and arrangement of parts for securing together the component parts of the arm, and to facilitate attachment thereto of cooperating part of the wheel suspension.

Other objects and advantages of the invention will be more apparent from the following description taken in connection with the illustrated embodiments of the invention in the accompanying drawing, in which:

Fig. 1 is a front elevational view showing a typical portion of the motor vehicle chassis embodying the improved control arm or linkage.

Fig. 2 is a top plan view taken as indicated by the line 2—2 of Fig. 1, with parts being broken away and in section.

Fig. 3 is a sectional view taken as indicated by the line 3—3 of Fig. 2.

Fig. 4 is a view similar to Fig. 3 but illustrating a modified form of reinforcing member for the control arm.

Fig. 5 is a perspective view of the reinforcing member shown in Fig. 4.

According to the illustrated embodiments of the invention, the motor vehicle is provided with a suitable frame structure generally designated by the numeral 10 including a cross member 11 which connects the usual side rails (not shown) and projects laterally outwardly therefrom.

A typical front steerable ground wheel 12 is adapted to having rising and falling movements relative to the frame structure 10 and independently of the remaining ground wheels of the vehicle by reason of the supporting and guiding mechanism comprising a steering knuckle 13 rotatably journalling the wheel 12 by the usual spindle 14. The knuckle 13 is swivelly connected by a king pin 15 with the generally vertically extending knuckle bracket support arm 16 having articulated or pivoted connections at its upper and lower ends respectively with the upper and lower laterally extending linkages 17 and 18.

The lower linkage 18 is preferably of the wishbone type and comprises a pair of arms having their inner ends pivotally supported from the frame structure by a shaft 19, while the outer ends thereof have an articulated connection at 20 with the knuckle bracket support arm 16. A shock absorber 21, preferably of the telescoping type, has a connection at 22 with the arm 16 and is adapted to be connected to the upper linkage 17 as will hereinafter more fully appear.

The upper control arm or linkage 17 includes a pair of sheet metal channel arms 23 and 24 opening inwardly toward each other and having the flanges thereof vertically spaced. The inner adjacent ends of the arms 23 and 24 are spaced for articulated connection with a shaft 25 carried by the cross member 11. The webs of the arms are respectively provided with inwardly extending integral hollow bosses 26, each having an internal threaded surface receiving a bushing 27 threaded onto the adjacent end of the shaft 25 to thereby pivotally support the inner end of the arm 27 from the frame. The outer adjacent ends of the arms 23 and 24 are also spaced, each having an opening in the web thereof registering with a relatively short boss 28, the wall of the boss and opening being threaded for receiving a shaft 29 onto which is threaded an eccentric bushing 30 carried by the support arm 16 at the upper end thereof, thereby providing an articulated connection between the latter arm and the outer end of the control arm or linkage 17.

For the purpose of strengthening and rigidifying the control arm 17, the arms 23 and 24 converge intermediate their ends to provide a portion 31, defining a box in cross section which is preferably closed, the portion 31 representing a substantial portion of the length of the arm 17. Within the box portion 31 and integrally formed with the web of each arm 23 and 24 is a hollow laterally projecting boss 32, the bosses cooperating with the registering opening in the web to provide a continuous opening through the box. A channel-shaped member 33, having a rubber buffer 34 suitably secured thereto, has the flanges thereof receiving the box portion 31, each of these flanges being provided with an opening registering with the continuous opening through the box. A connecting member, generally indicated at 35, extends through these registering openings, the member 35 having an enlarged portion 36 abutting the adjacent flange of the member 33 and is drawn thereagainst by a securing nut 37, the member 35 thus secures the arms 23 and 24 together, secures the buffer carrying member 33 thereto, and has a portion 38 thereof projecting cantilever-like from the box and to which is secured the upper part of the shock absorber 21.

In assembling the component parts of the arm or linkage 17, the free end faces of the respective registering flanges of the arms 23 and 24 and the free end faces of the bosses 32 are brought into abutting relationship and are then secured together as by butt-welding, as indicated at 39.

Referring to Figs. 4 and 5, the hollow laterally projecting bosses 32 of the arms 23, 24 have been supplanted by a tubular member 39' having the end faces thereof respectively abutting the inner face of an arm web, each web having an opening therein registering with the tubular member 39' for accommodating reception of the connecting member 35 as shown in Figs. 1 to 3, inclusive.

The member 39' can be made from a blank of flat stock with a plurality of projections 40 on a face thereof and then formed to tubular shape as shown in Fig. 5 with the projection 40 circumferentially spaced about an end face thereof. It will be understood that the terminal portions of the tubular forming member may be secured together if desired. The face carrying these projections is welded to the web of the arm 23, the projections providing a quantity of metal which facilitates welding the member 39' to the arm 24, the projection welding method being preferably employed for this purpose. While the member 39' is not attached to the web of the arm 24, such attachment may be effected if desired.

The members 39, 39' provide a reinforcement for the boxed section of the control arm, as set forth in connection with Figs. 1 to 3, inclusive, is relatively inexpensive to produce and facilitates assembly of the arms 23, 24 to provide the structural control arm 17.

Although but two embodiments of the invention are herein shown and described, it will be understood that various changes in the size, shape and arrangement of parts may be made without departing from the spirit of our invention and it is not our intention to limit said invention other than by the terms of the appended claims.

We claim:

1. A control arm for an independent wheel suspension including a pair of sheet metal arms having their corresponding opposite ends spaced apart and adapted to receive an articulating connector, each arm being flanged at least at an intermediate portion thereof to provide a channel, said channels opening one toward the other with the corresponding flanges of said arms brought together in abutting relationship with each other intermediate the length of said arms to form a closed box in cross section, the respective webs of said channels having lateral bosses extending one toward the other and in engaging relationship for resisting movement of said webs one toward the other, and a securing member extending through said bosses and the channel webs and including means tending to draw the latter one toward the other against the resistance of said bosses.

2. A control arm for an independent wheel suspension including a pair of sheet metal arms having diverging corresponding opposite ends adapted to receive on articulating connector, each of said arms being flanged at least at an intermediate portion thereof to provide a channel, said channels opening one toward the other and cooperating to form a closed box in cross section, the corresponding flanges of said arms in the region of said box being secured one to the other, the respective webs of said channels having lateral bosses extending one toward the other, and means extending through said bosses for securing said arms together.

3. A control arm for an independent wheel suspension comprising a pair of sheet metal channel arms opening toward each other and having diverging adjacent end portions, an intermediate portion of said arms converging to form a closed box in cross section, bosses extending laterally from respective opposite sides of said box and abutting one against the other, and means extending through said box for securing said arms together.

4. A control arm for an independent wheel suspension for motor vehicles comprising a pair of sheet metal channel arms opening inwardly toward each other, an intermediate portion of said arms defining a closed box in cross section, a member securing said arms together at said box and having a portion thereof projecting from the latter providing a connection between said arm and a shock absorber, and a buffer carrying member secured to said arm by said first mentioned member.

5. A control arm for an independent wheel suspension for motor vehicles comprising a pair of sheet metal channel arms opening inwardly toward each other, an intermediate portion of said arms defining a closed box in cross section, hollow reinforcing means in said box extending between opposite walls thereof, a buffer carrying member having spaced flanges receiving said box, said flanges and said box having openings registering with said hollow reinforcing means and a securing member extending through said registering openings and said reinforcing means, said securing member providing a connection between said arm and a shock absorber.

6. A control arm for an independent wheel suspension comprising a pair of sheet metal channel arms so disposed that the channels of said arms face inwardly toward each other, said arms having their corresponding opposite ends spaced apart from each other, said channel arms having their corresponding upper and lower flanges brought together intermediate the ends of said arms to provide a hollow closed box in cross-section, the web of each of said channel arms having an opening at the region of said hollow box, a hollow reinforcing structure extending through said hollow box between the portions of the webs of said arms which bound said openings, and means including a connecting member extending through said openings and through said hollow reinforcing structure for securing said channel arms together at said hollow box.

7. A control arm for an independent wheel suspension comprising a pair of sheet metal channel arms opening toward each other and having diverging adjacent end portions, an intermediate portion of said arms converging to form a box in cross section, the respective registering flanges of said arms included in said box being secured one to the other, a member securing said arms together at said box, and a buffer element secured to said control arm by said member.

8. A control arm for an independent wheel suspension comprising a pair of sheet metal channel arms so disposed that the channels of said arms face inwardly toward each other, said arms having their corresponding opposite ends spaced apart from each other, said channel arms having their corresponding upper and lower flanges brought together intermediate the ends of said arms with the webs thereof in spaced relation to provide a hollow closed box in cross-section, and a hollow reinforcing structure extending between the webs of said arms through said hollow box, maintaining said webs in said spaced relation.

9. A control arm for an independent wheel suspension comprising a pair of sheet metal channel arms so disposed that the channels of said arms face inwardly toward each other, said arms having their corresponding opposite ends spaced apart from each other, said channel arms having their corresponding upper and lower flanges brought together intermediate the ends of said arms with the webs thereof in spaced relation to provide a hollow closed box in cross-section, the web of each of said channel arms having an opening at the region of said hollow box, and a hollow reinforcing structure extending through said hollow box between the portions of the webs of said arms which bound said openings, said structure maintaining said web portions in said spaced relation.

10. A control arm for an independent wheel suspension comprising a pair of sheet metal channel arms so disposed that the channels of said arms face inwardly toward each other, said arms having their corresponding opposite ends spaced apart from each other, said channel arms having their corresponding upper and lower flanges brought together intermediate the ends of said arms with the webs thereof in spaced relation to provide a hollow closed box in cross-section, and a hollow member disposed in said hollow box having end portions thereof respectively abutting said webs for maintaining the latter in said spaced relation.

11. A control arm for an independent wheel suspension comprising a pair of sheet metal channel arms so disposed that the channels of said arms face inwardly toward each other, said arms having their corresponding opposite ends spaced apart from each other, said channel arms having their corresponding upper and lower flanges brought together intermediate the ends of said arms with the webs thereof in spaced relation to provide a hollow closed box in cross-section, and a hollow reinforcing member disposed in said hollow box having end portions thereof respectively abutting said webs for maintaining the latter in said spaced relation, said webs having openings therein aligned with said hollow reinforcing member whereby to accommodate extension of a support forming member through said hollow box.

FREDERIC W. SLACK.
CHESTER C. UTZ.